(12) United States Patent
Chang (10) Patent No.: US 9,804,000 B2
(45) Date of Patent: Oct. 31, 2017

(54) OPTICAL SENSOR ARRAY APPARATUS

(71) Applicants: Yun-Shan Chang, San Jose, CA (US);
Da Wei Lin, New Taipei (TW)

(72) Inventor: Yun-Shan Chang, San Jose, CA (US)

(73) Assignees: Yun-Shan Chang, San Jose, CA (US);
Da Wei Lin, New Taipei (TW)

( * ) Notice: Subject to any disclaimer, the term of this patent is extended or adjusted under 35 U.S.C. 154(b) by 0 days.

(21) Appl. No.: 14/036,233

(22) Filed: Sep. 25, 2013

(65) Prior Publication Data

US 2015/0085298 A1   Mar. 26, 2015

(51) Int. Cl.
*G01B 11/02* (2006.01)
*G01D 5/347* (2006.01)
*G06F 3/0354* (2013.01)

(52) U.S. Cl.
CPC ......... *G01D 5/347* (2013.01); *G06F 3/03543* (2013.01); *G06F 3/03541* (2013.01)

(58) Field of Classification Search
CPC .. G01D 5/347; G06F 3/03541; G06F 3/03543
USPC ........................................................ 356/497
See application file for complete search history.

(56) References Cited

U.S. PATENT DOCUMENTS

| | | | |
|---|---|---|---|
| 7,042,575 B2 | 5/2006 | Carlisle et al. | |
| 8,144,931 B1 * | 3/2012 | Hartman et al. | 382/103 |
| 8,913,251 B2 * | 12/2014 | Tin | 356/600 |
| 2005/0095697 A1 * | 5/2005 | Bachur et al. | 435/287.2 |
| 2005/0104089 A1 * | 5/2005 | Engelmann et al. | 257/204 |
| 2008/0158158 A1 * | 7/2008 | Cheah et al. | 345/166 |
| 2008/0165263 A1 * | 7/2008 | Hsu | 348/281 |
| 2009/0179656 A1 * | 7/2009 | Mueller et al. | 324/751 |
| 2011/0150363 A1 | 6/2011 | Chen et al. | |
| 2011/0267384 A1 * | 11/2011 | Fujiwara et al. | 345/690 |
| 2012/0020529 A1 | 1/2012 | Chen et al. | |
| 2013/0241835 A1 * | 9/2013 | Lee | 345/166 |

FOREIGN PATENT DOCUMENTS

| | | | |
|---|---|---|---|
| TW | 200910160 A | 3/2009 | |
| TW | 201122920 A | 7/2011 | |
| TW | 201205031 A | 2/2012 | |

* cited by examiner

*Primary Examiner* — Kara E Geisel
*Assistant Examiner* — Hina F Ayub
(74) *Attorney, Agent, or Firm* — Rosenberg, Klein & Lee (57) ABSTRACT

Disclosure is related to an optical sensor array apparatus. According to one embodiment of the invention, multiple sensor pixels are arranged as an array and forming a sensor array. Every comparator circuit is connected to one sensor pixel so as to calculate its energy state. A light source such as laser is installed in the apparatus. A control circuit is provided to recognize the sensor pixels' energy states for determining the spatial interference difference made by the reflected ray. The sensor array apparatus may be adapted to various surfaces since the light intensity and exposure time is able to be modulated as a compensation mechanism.

10 Claims, 7 Drawing Sheets

OPTICAL SENSOR ARRAY APPARATUS

BACKGROUND

1. Technical Field

The present invention is generally related to an optical sensor array apparatus, in particular, to the apparatus having a plurality of sensor pixels arranged in an array.

2. Description of Related Art

The conventional optical sensor is the sensing component such as Complementary metal-oxide-semiconductor (CMOS), or Charge-coupled Device (CCD) that converts the received light signals into electric signals. A certain optical intensity (energy) may be captured by these sensors in general. By this scheme, in addition to capturing images, a distance sensor may be implemented for the sensor is able to determine the distance from a light source. The sensor is also used to calculate the energy change with time.

An optical indexer is such as a computer mouse that is used to determine a moving track by the inside optical sensor. While a light emitted to an operative surface, a moving vector may be determined by the sensor to collect the energy change within a time interval and to perform image processing. The conventional optical computer mouse is referred to FIG. 1 that depicts inner circuits. This optical mouse 10 moves over a surface 11. Within its device housing 12, the inner circuits include a circuit board 14 in addition to the essential optics elements. Further, a controller 18 used to control, sense and operate light emission, a light source 16, and a sensor 19 are disposed on the circuit board 14.

Figure 1:
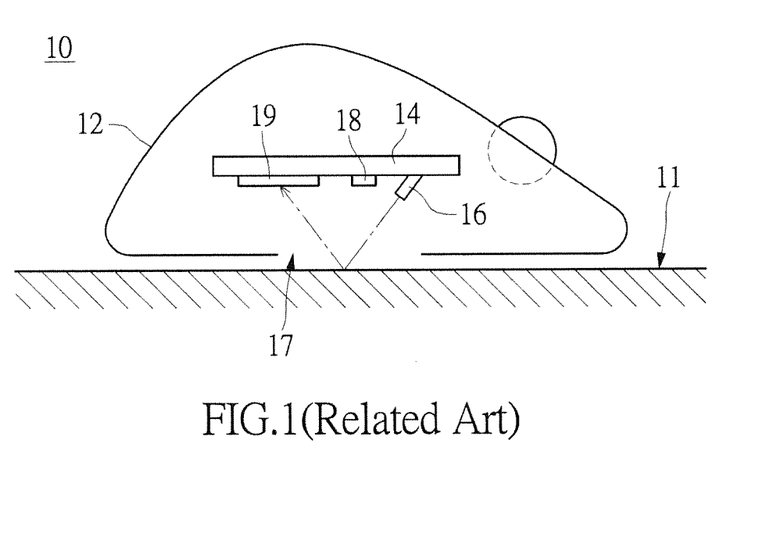
FIG. 1 shows the inner circuits of the conventional optical mouse.

According to the present example of the optical mouse 10, an aperture 17 directed to external surface 11 is formed on its housing 12. The circuit board 14 is disposed near the aperture 17. A light source 16 such as a laser die or LED is disposed onto the circuit board 14. The light source 16 continuously emits lights to the surface 11 with a specific angle while the optical mouse 10 operates. The shown broken line represents the path of the incident light. A sensor 19 receives reflected light from the surface 11. The sensor 19, such as a CMOS or CCD image sensor, may obtain a distribution diagram made by the reflected light. The controller 18 then obtains a moving direction of the optical mouse 10 by analyzing the energy distribution.

In the conventional technology that determines the moving track of the optical mouse 10, the surface 11 may dominate the performance of tracking the optical mouse 10 since the signals of reflected light made by the surface 11 is the essential information.

For example, the conventional optical mouse 10 may not normally operate when it moves over a transparent material or the surface (11) that hard to reflect the light. Further, the optical mouse 10 may not easily work when it moves over an undulate non-planar surface 11, for example the cloth with wrinkles.

For the purpose of light tracing, the conventional technology may not function well when the optical indexer moves over a transparent surface or the surface that not easily reflects the light. These types of surfaces may cause the failure to determine the movement.

In the conventional technologies, some of them use additional positioning measures to acquire the moving tracks, or some use additional complicated algorithm to maintain a certain ability of tracing the movement. However, theses positioning measures or algorithm may be limited to some types of surfaces because of the limitations of sensitivity, high energy consumption, and complexity. However, these technologies are not applicable to or achieve light tracing over every surface with too high or too low reflectivity.

SUMMARY

In view of the conventional device such the optical computer mouse adopting the optical sensor may not function well over all the surfaces with too high or low reflectivity, provided in the disclosure is related to an optical sensor array apparatus. The optical sensor array apparatus includes a plurality of sensor pixels arranged in an array. The array-formed sensor pixels with the corresponding tracing algorithm implement the light tracing method.

According to one of the embodiments in the disclosure, a light source such as a Laser that provides the light with good spatial coherence is provided. This kind of light source allows the device such as optical computer mouse to efficiently perform light tracing. The scheme provided in the present invention incorporates the photo constructive and destructive interference patterns formed by the incident lights and the reflected lights to identifying traces.

In an exemplary embodiment, the essential elements of the optical sensor array apparatus include the multiple sensor pixels arranged in an array. The sensor pixels constitute a sensor array. The sensor pixels may be packaged into one integrated circuit (IC). The sensor array, exemplarily including some dummy sensor pixels, is configured to receive the lights reflected from a surface. Some comparators are also included, in which each comparator may be installed with respect to one sensor pixel. One of the objectives of the comparator is to compare at least two input energy signals, for example respectively from the every sensor pixel and an average of the energies outputted from all or part of the sensor pixels. The apparatus may further include a light-source component such as Laser incorporated to emitting a light to the surface.

The apparatus also includes a control circuit used to control the light generation made by the light-source component. The control circuit also collects the energy signals from the sensor pixels. The control circuit then determines if any energy difference from the spatial interference induced by the reflected light.

In the embodiment, one major function of the control circuit is to dynamically adjust the exposure time of the light-source component. The control circuit also controls the duty cycle by a pulse width modulation scheme, so as to configure the emission period of the light-source component. The control circuit dynamically adjusts a gain to the energy signals outputted from the sensor pixels. Further, the light intensity generated by the light-source component may be adjustable thereby.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

Disclosure is related to an optical sensor array apparatus, which includes a sensor array essentially composed of a plurality of sensor pixels arranged in an array. In one embodiment in the disclosure, the sensor array is used to receive reflected lights from a surface. While the plurality of sensor pixels receive the lights, it may acquire constructive or destructive interference patterns from the energies of the reflected lights. The energy changes within a period of time may be calculated to determine a moving vector of the apparatus. The movement relative to the surface may be determined, especially to an optical indexer.

For example, for the optical computer mouse, a coherent light or said the light with great spatial coherence is preferably applied. The coherent light allows the determination of the moving tracks to be more efficient. The determination may be cooperated with a scheme of sensitivity compensation that employs a movement recognition algorithm for light tracing. By which, the light tracing method can be applied to the various type of surfaces.

It is worth noting that a scheme of coherent light source package integration is introduced to the related sensor array apparatus according to one embodiment of the disclosed invention. The apparatus such as an optical indexer needs not to mount any additional optical lens or specific image sensor, for example the CMOS image sensor (CIS).

In view of the conventional photo sensor applied in the optical mouse is not always adapted to the surface with high or too low reflectivity, the optical sensor array apparatus having the array-formed sensor chip is operated with a light tracing algorithm. The Laser is one of selections of the light sources since it has great spatial coherence. The Laser or the like allows the optical computer mouse to perform great light tracing. The mentioned optical constructive and destructive interference patterns are formed to conduct the tracing.

Figure 2:
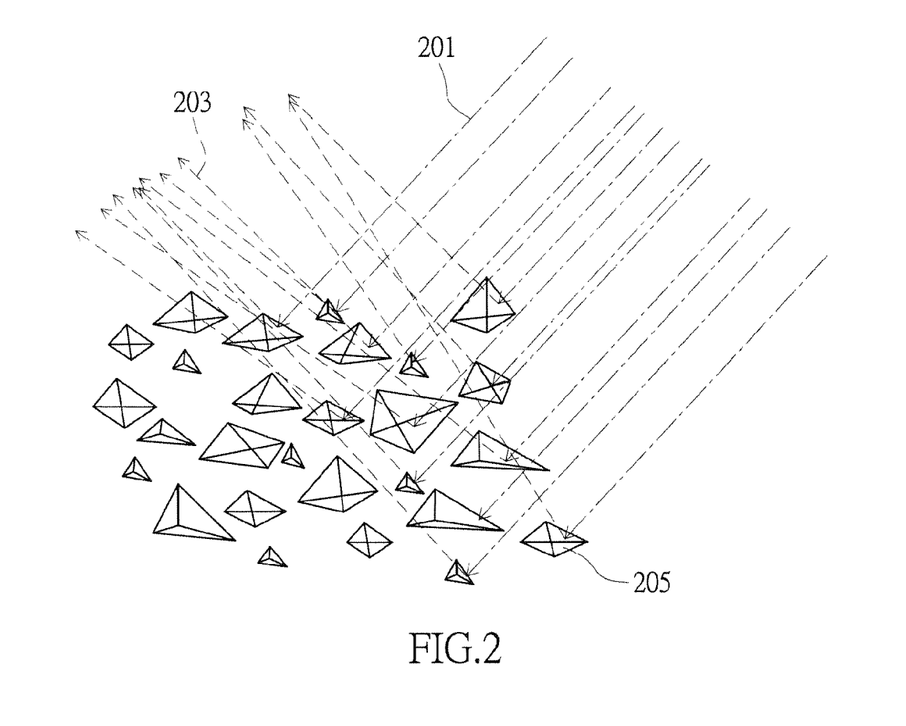
FIG. 2 shows a schematic diagram of an incident plane and the reflected light paths.

Reference is made to FIG. 2 depicting an incident light (20) made by a specific light source (not shown) emitted to a surface and then reflected (203). Therefore multiple reflected light paths expressed by the multiple lines are generated. The light source may utilize Laser, the coherent light. It is noted that the described coherent light may also be the light with great spatial coherence.

The shown multiple light paths involving the paths indicative of incident lights 201 emitted to a surface with surface structure 205, and the paths for reflected lights 203. Within a microscopic view of field, the surface structure 205 has irregular structure that causes, the multi-directional reflected lights 203 as shown in the diagram.

The light source may continuously generate the incident lights 201 to the surface, and form the reflected lights 203. The reflected lights 203 are received by the sensor (not shown), in which the lights form the optical constructive and destructive interference patterns. It is particular that the light source is a coherent light source that generates the coherent incident light allowing enhancing the interference effect.

When the apparatus installed with the circuits embodying the mentioned light tracing method moves over an X-Y plane, the photo sensor receives the reflected lights 203. The apparatus samples the signals within a period of sampling time, and calculates average energy of the reflected lights. After that, an energy difference in different times or at different positions may be obtained. The sensor array apparatus according to the disclosure may preferably incorporate a sensor array that is used to obtain the energies at the different positions, and difference between the average energies. The moving track may therefore be determined. The calculation of the statistic average may include acquiring a statistic average from the energies received by all the sensor pixels; or the average is made by part of the sensor pixels. For example, the average is referred to the sensor pixels over a row such as the X direction shown in FIG. 5; or over a column such as the Y direction. The energy average may also be calculated from the energies received by the surrounding sensor pixels or centered pixels within a specific area.

In one of the embodiments incorporating the sensor array, the interference effect may be enhanced while the light source generates coherent light. It is noted that the coherent light introduces a very small phase delay within a wave envelope. The Laser is one type of the coherent lights rather than the non-coherent light such as sunlight or LED light.

To improve sensitivity of the optical sensor under the interface made by the reflected light, the coherent light is preferably introduced to the optical sensor array apparatus of the present invention. The coherent light may cause much small phase delay since it is featured to have less phase difference. To the spatial interface made by the non-coherent reflected light, the coherent light may cause comparative small phase delay. The coherent light may therefore advantage the spatial interference effect of the reflected light. The above-mentioned sensor array may calculate the difference of the spatial interface by the lights reflected from a surface.

Figure 3:
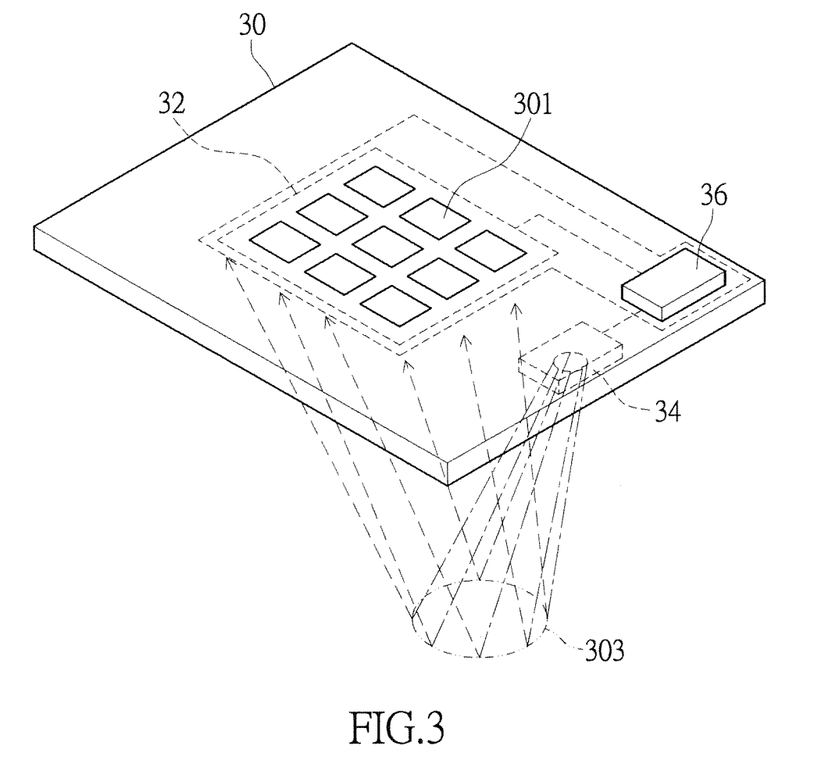
FIG. 3 shows a schematic diagram of a sensor array packaged in one integrated circuit of the optical sensor array apparatus in one embodiment of the present invention.

The sensor array such as the sensors shown in FIG. 3 describing the sensor array apparatus is packaged into one IC. According to one of the embodiments, the sensor array and the related controlling circuits are integrated into one semiconductor circuit. The mentioned light source, sensor array, and the controller may be packaged onto a circuit board within the optical sensor array apparatus. Therefore, there is no need to install any optical sampling element such as lens or specific semiconductor process such as CIS so as to advance photosensitive sensitivity.

A circuit board 30 shown in the figure is installed in one apparatus such as an optical computer mouse or a specific indexer. A sensor array 32 is mounted onto the circuit board 30 of the optical sensor array apparatus. The sensor array 32 includes a plurality of sensor pixels 301 arranged in an array.

The sensor pixels 301 are integrated into an IC. In particular, the sensor array 32 and the controller 36 are integrated. In particular, the sensor pixels 301, especially the dummy sensor pixels shown in FIG. 5, of the sensor array 32 may be configured to have a fixed distance and an even relative position existed between two adjacent sensor pixels. The configuration allows the sensor array to receive the reflected lights evenly. The sensor pixels 301 of the sensor array 32 may evenly receive the reflected lights from their fixed positions. A light source 34 schematically emits lights onto a surface and forms the shown illuminated area 303. The lights reflected from the surface may then emit the sensor array 32. The every sensor pixel 301 receives the reflected light from different directions. A suitable photoelectric signal conversion may be applied to the signals received by the sensor pixels 301. The controller 36 and related circuit are used to measure the statistic average of the energy by firstly summing up the energies received by the sensor pixels 301. Next, the difference of the statistic average and the energy received by the every sensor pixel 301 can be obtained. The spatial interference difference made by the lights reflected from the surface can be obtained. The controller 36 may therefore determine the moving direction by accumulating multiple energy differences within a period of a sampling time.

About the spatial interface in the mentioned sensor array apparatus, especially, but not limited to, the coherent light source emits lights to the irregular surface structure of the surface and then generates the reflected lights with different directions. The optical interference is therefore produced. Interaction made between the incident lights and the reflected lights produces constructive or destructive interference patterns. The sensor array may acquire the spatial information from the interference patterns since the apparatus moves relative to the surface. The information associated to the movement over X-Y plane is therefore established.

In one embodiment, a Laser device may be introduced to be the light source of the sensor array apparatus adopted in a carrier such as the optical indexer. In a circuit board (30), the essential elements of the apparatus include a light source (34) that is sued to generate an incident light emitted to a surface; a sensor array (32) including multiple sensor pixels (301) arranged in an array; a controller (36) coupled to the light source (34) and the sensor array (32), used to receive the light signals received by the sensor pixels (301). The energy state of every sensor pixel and the difference of the energy states within the period of sampling time can be acquired.

Figure 4:
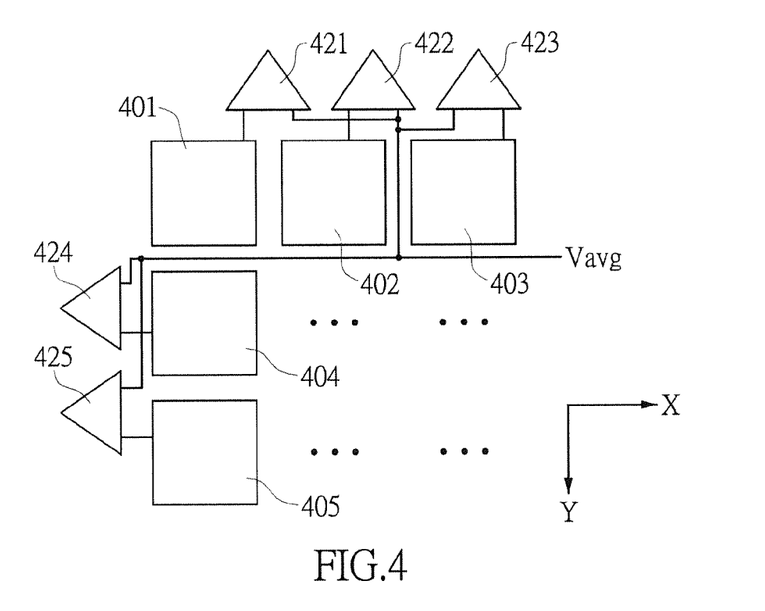
FIG. 4 shows a schematic diagram of the sensor array adopted by the apparatus in one embodiment of the present invention.

Reference is now made to FIG. 4 describing calculating a distribution of the energies received by the sensor array of the optical sensor array apparatus.

Further, FIG. 4 schematically shows a layout of the sensor array. A plurality of sensor pixels are arranged over an X-Y plane to form an "N×M" sensor array. It is noted that the geometric shape of the sensor array may be, but not limited to, symmetric rectangle, square, circle, or oval-shaped. The sensor pixels 401, 402, 403, 404, and 405 are arranged in an array respectively along X and Y directions. It is noted that the practical number of the pixels is not limited to the figure. The circuit board with these sensor pixels 401, 402, 403, 404, and 405 further includes other elements such as the comparators 421, 422, 423, 424, and 425. The every comparator correspondingly associates with a sensor pixel. The input value is the average voltage signal Vavg generated by the every sensor pixel. This average voltage signal Vavg is compared with voltage signal generated by the sensor pixel as receiving the light. The comparison results in the high or low voltage value. At last, it is featured to determine the moving direction by acquiring the comparisons of the two adjacent sensors in the tracing method.

Figure 7:
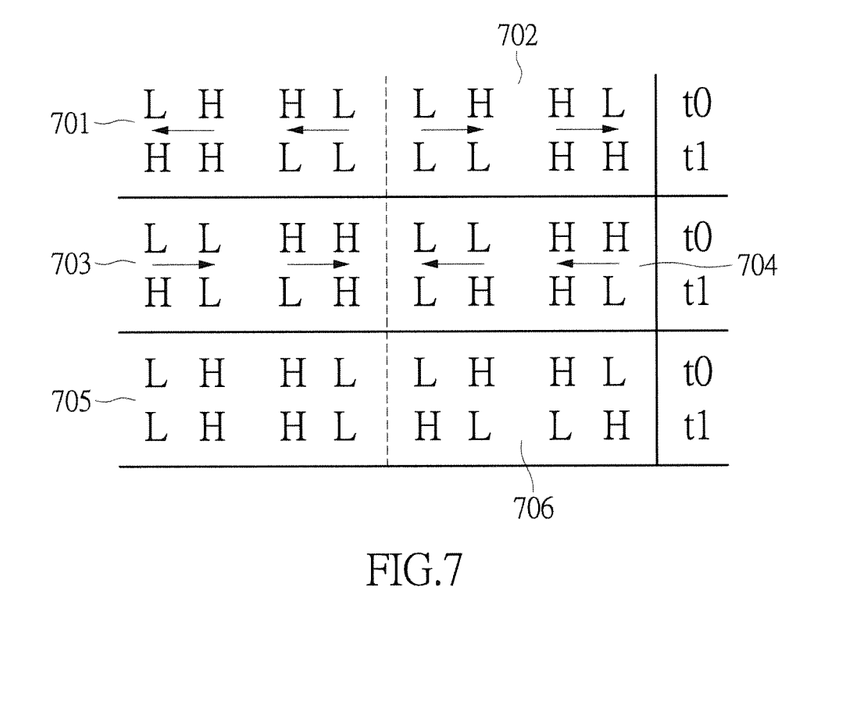
FIG. 7 shows an exemplary diagram describing the method of light tracing in the sensor pixels in one embodiment of the present invention.

In the diagram, the shown comparator 421 is coupled to the sensor pixel 401. An input signal is such as the energy signal generated by the sensor pixel 401. The signal may be indicated by a voltage signal. The other input end shows an average voltage signal Vavg. The comparator 421 is used to compare the two inputs, and output a comparison result. In one embodiment, a binary characteristic value (H/L) is used to indicate this comparison result. The high and low voltage signals are respectively expressed by the characters H and L that as shown in FIG. 7.

According to one of the embodiments, the light tracing method applied to the optical sensor array apparatus is featured that an energy distribution over a plane is formed by depicting the constructive and destructive interference patterns of the reflected coherent lights. The change of the energy distribution at different times may be used to determine a moving vector. In an exemplary embodiment, a scheme of non-relative viewpoints is introduced to performing movement judgment. The scheme incorporates the energy information of the surrounding sensor pixels of the sensor chip to be compared with the average energy, so as to determine a moving direction. It is noted that, rather than the general method for determining the moving vector by the information extracted from the sensor pixels.

To the optical sensor array apparatus, in one layout of the sensor chip of an exemplary embodiment, the sensor chip includes the sensor pixels arranged in an array. The sensor pixels may include some inactive sensor pixels, said dummy sensor pixels, disposed around the chip. The centered sensor pixels are the active area to receive the lights. Therefore, while the control circuit or the related calculation circuit receives the energy signals from the sensor chip, only the energies made by the non-dummy sensor pixels are adopted to perform the calculation and further application. Reference is made to the layout of the sensor pixels shown in FIG. 5.

Figure 5:
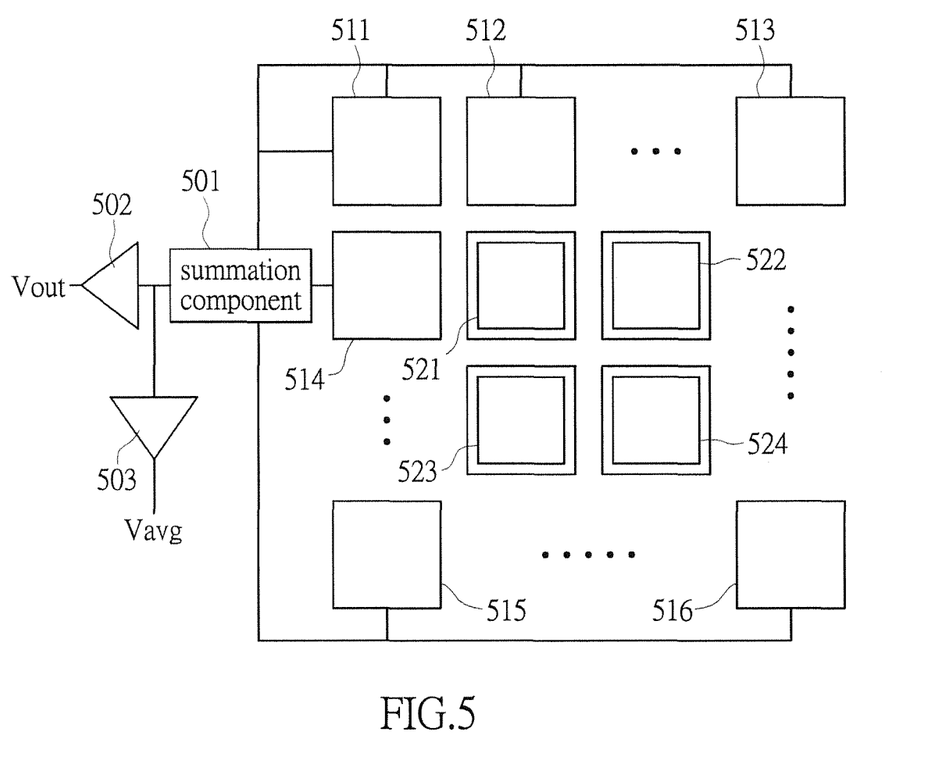
FIG. 5 schematically shows a layout of the sensor pixels arranged in an optical sensor array apparatus of the present invention.

The array-formed sensor pixels include some dummy sensors at surrounding area and the centered pixels. One major purpose of the disposal of the dummy sensors is to even the whole sensor chip in the manufacturing process. The energies are also received evenly by the sensor chip. In the diagram of the embodiment, the surrounding the chip are configured to be the inactive dummy sensor pixels 511, 512, 513, 514, 515, and 516. The sensor pixels 521, 522, 523, and 524 near the central area are the major portion to receive the signals.

When the sensor pixels are simultaneously exposed under the reflected lights, the centered pixels may evenly sense the photo signals. The surrounding sensor pixels may possibly receive uneven energies. The unstable or uncertain energies made by the dummy sensor pixels (511, 512, 513, 514, 515, 516) may be excluded while the total energy of the sensor chip is calculated. Therefore, this scheme allows the apparatus to acquire reference energy with better referral value.

As the diagram shows, a summation component 501, electrically connected with the every sensor pixel of the sensor chip, is provided in the circuit. The summation component 501 is able to receive the photocurrent from the every sensor pixel, and perform analog-to-digital conversion thereon. In which, a gain amplification process may be introduced to efficiently receiving the reference value since the photocurrent received by the every sensor pixel is tiny. The energy change within the period of time may be obtained from the amplified energies. After that, an output signal is formed when the photocurrents made by the senor pixels are processed by the gain amplifier 502. The output is likely represented by an output voltage Vout. Through a calculator 503, an average energy can be obtained from the available received energies and outputted. The output is such as the average voltage signal Vavg.

The above-mentioned output signals such as the output voltage Vout and the average voltage signal Vavg are outputted to the comparator, e.g. comparator 421 of FIG. 4. The comparator compares the energy signal made by the every sensor pixel and a reference value such as the average energy from all or part of the sensor pixels. Therefore, an energy state for the sensor pixel is defined. For example, the energy state of every sensor pixel may be represented by a binary characteristic value "H" abbreviated from high or "L" abbreviated from low.

Figure 6:
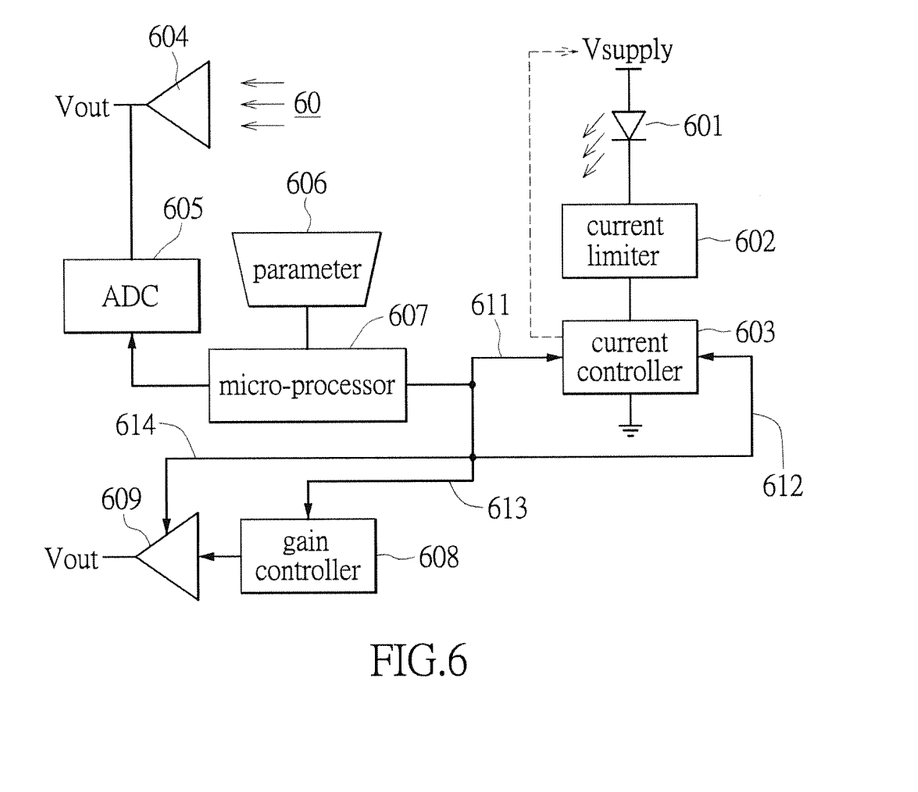
FIG. 6 shows circuit blocks depicting the functions of gain control and noise reduction within the optical sensor array apparatus of the present invention.

In one further embodiment of the present invention, the circuit also integrates the gain amplifier for amplifying signals, such as the gain amplifier (502), or/and noise-reduction circuit in addition to the above-described sensor pixels, light source, and control circuit disposed in the optical sensor array apparatus. Further reference is made to FIG. 6 showing the circuit blocks depicting the gain controlling and noise reduction within the optical sensor array apparatus.

The diagram schematically shows the control circuit of the optical sensor array apparatus of the present invention, for example the control circuit 36 of FIG. 3. A voltage source Vsupply is disposed in the control circuit, and provided to power the light-source component 601, for example Laser or LED, of the apparatus. The voltage source Vsupply is used to drive the light-source component 601 to emit lights. The Laser is a preferable light source to enhance the interference effect since it provides great spatial coherence.

A current limiter 602 may be incorporated to controlling the electric signals provided to the light-source component 601. The electric signals such as filtered voltage or current signals may also be fed back to a current controller 603. This current controller 603 is to manage the voltage or current made by the light-source component 601, for example to limit the current used to drive the light-source component 601.

While the lights emitted to a surface from the light-source component 601, the sensor array receives the reflected lights. The photo signals are converted to the energy signals after the sensor pixels receive the lights.

For the sensor array described in FIG. 5, the energy signals made by the dummy sensor pixels may neither be referred to determine the moving vector, nor the further energy state and any change. However, the signals made by the dummy pixels may also be referred to make other applications. For example, the light intensity signal 60 generated from reflected lights received by the dummy sensor pixels may be provided for the first gain controller 604 to adjust the intensity that makes reference for the micro-processor 607. The dummy sensor pixel generates the light intensity signal 60 as the output voltage Vout. This output voltage Vout is then converted to digital signals by the analog-to-digital converter 605. Further, the digital signals are fed back to the micro-processor 607 for adjusting the exposure time made by the light-source component 601, and performing the signal gain and noise reduction of the output signals made by the sensor pixels.

While the feedback signal for the micro-processor 607 is employed to automatically adjust the exposure time of the light-source component 601, the micro-processor 607 may issue a pulse width modulation (PWM) control signal to the current controller 602 over a signal line 611. This control signal is introduced to controlling the duty cycle for modulating the emission period of the light-source component 601. The adjustment to the exposure time may be used to control the apparatus to provide the light signals with appropriate length of time.

Further, the micro-processor 604 of the control circuit optimizes the light-source component 601 according to the light intensity signal. For example, over the signal line 612, a current control signal is transmitted to the current controller 603 for the purpose of modulating driving current, and further adjusting the light intensity generated by the light-source component 601. Therefore, a compensation mechanism may be established by referring to both the light intensity/brightness and the exposure time. The compensation mechanism allows the sensor array apparatus to adapt to the various surfaces with different surface structure and various distances from the apparatus to the surface.

Still further, the micro-processor 607 of the control circuit may control the signal gain for the every sensor pixel according to the feedback signals. For example, over the signal line 613, a control signal is transmitted. By the gain controller 608, the signal gain for the sensor pixel may be adjusted. The comparator 609 connected with corresponding sensor pixel compares the received energy and the average.

The light intensity signals made by the dummy sensor pixels received by the micro-processor 607 are referred, over the signal line 614, to adjust a noise-reduction threshold set in the comparator 609, so as to dynamically reduce the intrinsic noise of the sensor pixel.

In particular, the method applied in the optical sensor array apparatus in accordance with the present invention employs the change of both the time and the energy to determine the movement. The energy change may be expressed by a binary energy state such as the mentioned labels "H" and "L". The binary energy state reflects the comparison made between the value read from the every sensor pixel and the statistic average.

The apparatus firstly obtains the energies received by the multiple sensor pixels within a time interval between time t0 and t1. A statistic average is then obtained by averaging the energies received by all or part of the sensor pixels within the interval. The energy value obtained from the every sensor pixel may be expressed by voltage signal. The energy change may be obtained by calculating the difference between the energy value and the average.

After that, the energy change between the adjacent sensor pixels at different times (t0, t1) is referred to determine the direction made by the energy change. At last, an overall moving vector for the apparatus is therefore obtained by referring to the energy change.

The determination of the moving vector made by the binary characteristic value (H/L) may be referred to the light tracing method exemplarily described in FIG. 7.

The exemplary diagram shows a plurality of sensor pixel groups 701, 702, 703, 704, 705, and 706 arranged in an array. It schematically shows the energy change between the adjacent sensor pixels at different times, e.g. first time t0 and second time t1. The energy change is used to determine the moving vector.

In FIG. 7, the time labels "t0" and "t1" represent the two sampling times. The labels "H" and "L" respectively represent the high and low voltage signals outputted by the comparator. The labels "H" and "L" indicate the two types of energy states since two energies at two moments are compared with an average. This energy state indicated of an energy change may be expressed by the binary characteristic value (H/L). The voltage signals at the different times show a transition of the movement so as to determine the overall moving vector.

For example, a sensor pixel group 701 includes several sensor pixels at different energy states. It is shown at the left side of the diagram that the two sensor pixels are in different states at the first time t0, and exemplarily the sensor pixels respectively senses two states "L" and "H" (from left to right). The energy states "L,H" at the first time t0 are then transformed to the energy states "H,H" at the second time t1. It means the energy states of the two sensor pixels are transformed to the states "H,H" at the next moment. In which, it is determined that the energy state "L(t0)" of one of the sensor pixels is transformed to state "H(t1)", and it appears that the energy state "H" at the right position shifts to left position at the next moment. Therefore, in accordance with the present invention, it determines that the effective moving direction is from right to left within this sampling time.

Further, the energy states of another pair of sensor pixels in this sensor pixel group 701 are "H,L" at the first time t0; Next, at the second time t1, the energy states are transformed to next states "L,L". In which, the energy state of one of the sensor pixels is from state "H" to state "L". It appears that the energy state "L" at the right position shifts to left position. It therefore shows the effective moving direction is from right to left.

Next, within the sensor pixel group 702, the energy states "L,H" of the left two sensor pixels at the first time t0 are transformed to states "L,L" at the second time t1. It shows the energy state "H" at the right position is replaced by the state originally at left position. It therefore determined that the moving vector indicative of a direction from left to right.

Similarly, the energy states of the right two sensor pixels in the sensor pixel group 702 are "H,L" at the first time t0. At the second time t1, the energy states are transformed to next states "H,H". It shows the state "L" at the right position is replaced with the state "H" at the left position. It also determines that the moving vector indicative of the direction from left to right.

Further, there is no any arrow shown for the sensor pixel groups 705 and 706 after the determination shows there is no energy change therein. In which, the energy states for the sensor pixels are not changed from the first time t0 to the second time t1; or the change may not be qualified to determine any movement. For example, it is not able to determine the moving direction by this change since the energy states of the pixels in the sensor pixel group 706 are "L,H" at the first time t0, and be transformed to "H,L" at the second time t1. Therefore, the sensor pixel group 706 does not output any effective signal.

It consequently determines an overall moving vector by integrating all the obtained moving vectors when all the energy changes of all the sensor pixels are completely determined within the period of sampling time.

Figure 8:
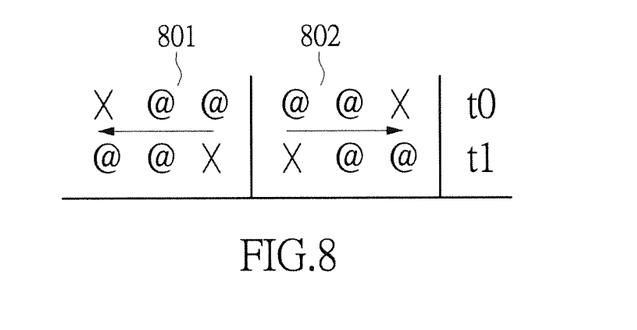
FIG. 8 shows another exemplary diagram describing the method of light tracing in the sensor pixels in another embodiment of the present invention.

One further embodiment for determining the movement may be referred to FIG. 8. FIG. 8 shows a schematic diagram depicting the method of light tracing.

The shown aspect for recognizing the moving vector is based on the transformation of the energy states of the sensor pixels at different times. The label "X" indicates meaningless value; and label "@" shows the available sensing signal be found between the times t0 and t1. The aspect utilizes the change among the labels to determine the moving vector.

The signal energies received by the multiple sensor pixels in the sensor chip can be compared with an average at the different times while the sensor chip receives the reflected light. The comparison results in high or low voltage signal. For example, the label "@" shown in the diagram represents the available voltage signal. In some conditions, it is labeled as "X" when no energy change or no meaningful voltage signal fluctuation can be found.

In the embodiment shown in FIG. 8, in the sensor pixel group 801, the label "X@@" shows the comparator found the energy change among the adjacent sensor pixels at the first time t0. At the second time t1, the energy change made to the sensor pixels are labeled as "@@X". When the energy state "X@@" at the first time t0 are transformed to the state "@@X" at the second time t1, it appears that the label "@@" are shifted to left position. It is therefore a leftward shift in the sensor pixel group 801 determined, as the arrow shows in the diagram.

Further, in the sensor pixel group 802, the energy state of the adjacent sensor pixels is "@@X" showing the energy change occurred at the first time t0; and the energy state is "X@@" at the second time t1. The transformation is made between the times t0 and t1, and it shows the label "@@" is rightward shifted. The method of light tracing may therefore adopt this scheme to determine the overall movement within a period of time.

It is worth noting that any tiny error made to the sensor array incorporated in the apparatus of the present invention may not influence correct determination of the movement. When the light tracing method is applied to an optical computer mouse, the slow change of the reference signals may not influence the overall determination because the shifting rate as manipulating the mouse is far lower than the processing rate of the control circuit within the apparatus.

To sum up the above description, disclosure is related to the optical sensor array apparatus that is integrated into one semiconductor package. The integration effectively reduces the intrinsic noise inside the apparatus. A compensation mechanism is further provided to dynamically adjust the intensity or brightness of the light source, and adjust the exposure time accordingly. This compensation mechanism allows the sensor array apparatus to adapt to various types of surfaces.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical sensor array apparatus, comprising:
   a plurality of sensor pixels arranged in an array, constituting a sensor array used to receive lights reflected from a surface; wherein the sensor array includes multiple dummy sensor pixels disposed around the sensor array;
   a plurality of comparators, wherein every comparator is disposed with respect to one sensor pixel and used to compare two input signals respectively from the every sensor pixel and a statistic average;
   a light-source component, used to generate the lights emitted to the surface, wherein the light-source component generates a coherent light with good spatial coherence; and
   a control circuit, electrically connected to the plurality of sensor pixels, the comparators and the light-source component, used to configure the light-source component to emit the lights and receive energy signals retrieved from the sensor pixels; wherein the control circuit determines an energy difference from spatial interference induced by the reflected light as the coherent light allows enhancing the interference;

wherein, the control circuit calculates the statistical average by averaging the energy signals received by all or part of the non-dummy sensor pixels after receiving the energy signals from the sensor pixels, and an energy state for the every sensor pixel is defined according to the energy difference between the statistical average and the energy signal of every sensor pixel, and there are two types of energy states represented by binary characteristic values, in which change of the energy states for the sensor pixels in the array within a period of a sampling time shows a transition of a movement of the optical sensor array apparatus.

2. The apparatus according to claim 1, wherein, a fixed distance and an even relative position are existed between two adjacent sensor pixels.

3. The apparatus according to claim 2, wherein the multiple sensor pixels are packaged into one integrated circuit.

4. The apparatus according to claim 1, wherein the control circuit dynamically adjusts exposure time of the light-source component.

5. The apparatus according to claim 1, wherein the light-source component is a Laser device.

6. The apparatus according to claim 1, wherein the control circuit controls duty cycle of the signals by a pulse width modulation scheme so as to control emission period of the light-source component.

7. The apparatus according to claim 1, wherein the control circuit dynamically adjusts a gain to the energy signals outputted from the sensor pixels.

8. The apparatus according to claim 7, wherein the control circuit controls the gain for each sensor pixel according to feedback energy signals made by the sensor array having the multiple sensor pixels.

9. The apparatus according to claim 1, wherein the control circuit adjusts light intensity generated by the light-source component.

10. The apparatus according to claim 9, wherein the control circuit adjusts a driving current for the light-source component according to the light intensity signals received by the dummy sensor pixels, so as to adjust the light intensity outputted from the light-source component.

* * * * *